(12) United States Patent
Flaxer et al.

(10) Patent No.: US 7,991,669 B2
(45) Date of Patent: Aug. 2, 2011

(54) METHOD AND SYSTEM FOR ENTERPRISE PORTFOLIO MANAGEMENT BASED ON COMPONENT BUSINESS MODEL

(75) Inventors: David Bernard Flaxer, Dobbs Ferry, NY (US); Richard Thomas Goodwin, Dobbs Ferry, NY (US); Vijay Sourirajan Iyengar, Cortlandt Manor, NY (US); Anil Nigam, Stamford, CT (US); John George Vergo, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 11/493,442

(22) Filed: Jul. 26, 2006

(65) Prior Publication Data

US 2008/0033888 A1 Feb. 7, 2008

(51) Int. Cl.
*G06Q 40/00* (2006.01)
(52) U.S. Cl. .................................. 705/36 R; 705/35
(58) Field of Classification Search .................. 705/36, 705/36 R
See application file for complete search history.

(56) References Cited

U.S. PATENT DOCUMENTS

| | | | |
|---|---|---|---|
| 7,778,899 B2* | 8/2010 | Scumniotales et al. | 705/35 |
| 7,853,508 B2* | 12/2010 | Scumniotales et al. | 705/36 R |
| 2003/0135399 A1* | 7/2003 | Ahamparam et al. | 705/7 |
| 2003/0158800 A1* | 8/2003 | Pisello et al. | 705/35 |
| 2006/0116947 A1* | 6/2006 | Cimral et al. | 705/35 |
| 2006/0122873 A1* | 6/2006 | Minotto | 705/7 |
| 2009/0076983 A1* | 3/2009 | Scumniotales et al. | 705/36 R |

* cited by examiner

*Primary Examiner* — Jagdish N Patel
*Assistant Examiner* — Kevin Poe
(74) *Attorney, Agent, or Firm* — Derek S. Jennings; Anne Vachon Dougherty

(57) ABSTRACT

An Enterprise Management Portfolio Hub allows a user to perform enterprise portfolio management activities from a single point of control. EPMH relates information, analysis, display and control based on the organizing concept of the business components that comprise the CBM map of the enterprise by collecting portfolio information from existing portfolio management tools and generating a portfolio model. It allows the user to interact with or access information from various Portfolio Management applications and services through the portfolio model. EPMH supports evaluative techniques that can be used to identify areas for business transformation and to generate transition plans.

25 Claims, 13 Drawing Sheets

METHOD AND SYSTEM FOR ENTERPRISE PORTFOLIO MANAGEMENT BASED ON COMPONENT BUSINESS MODEL

FIELD OF THE INVENTION

This invention relates generally to component-based business models and, more particularly, to the management of portfolios of resources and assets within the business enterprise based on the Component Business Model (CBM) framework.

BACKGROUND OF THE INVENTION

In business, the term "portfolio" is used to define a set of common related artifacts (e.g., software applications, hardware systems, facilities, business projects, etc.) that are managed through a calculated balance of business value and business cost. Business modeling provides a mechanism for representing an organization in order to provide predictability as well as scalability for making decisions. Prior art approaches to business modeling represented an organization in terms of a specific dimension and/or property (e.g. its systems, organization structure, or geographic footprint) or in terms of particular themes and key processes (e.g. risk exposure, capital deployed, new product development and deployment). However, the prior approaches did not attempt to analyze the interdependencies between differing aspects (such as people/process/technology) in a common perspective.

In today's enterprise environment, Enterprise Portfolio Management (referred to as EPM) presents a number of difficult challenges. Portfolio management information and control is fragmented in separate, non-integrated management applications and services, such as those that manage people, processes and technology, throughout an enterprise. This lack of integration and access to required information makes it difficult to understand the key relationships and renders effective decision making impossible. Business leadership does not have an effective means of specifying and communicating business strategy to those who manage resources and realize business solutions, thus causing a gap of misalignment between business strategy and realized business solutions. Today's portfolio management decisions do not effectively account for a wide range of competing requirements and constraints. As a result it is very hard to arrive at a reasonable, let alone optimum EPM plan. Multiple users with different roles and responsibilities cannot collaborate and communicate effectively. A common organizing framework or view of the enterprise does not exist among members of the enterprise resulting in miscommunication and inefficiency.

The Enterprise Portfolio Management problem may be stated as "the management of related portfolios of selected assets, so as to accomplish measurable strategic goals of the enterprise." EPM is a hard problem since it attempts to account for a variety of strategic objectives of the enterprise as portfolio management decisions on related portfolios of assets are determined. An essential requirement to making progress towards solving the EPM problem is the ability to reason, qualitatively as well as quantitatively, about the impact of portfolio trade-off decisions on the strategic objectives of the enterprise. This calls for a unifying representation on which the portfolio management decisions are analyzed and compared in order to understand their collective impact on the enterprise. It is desirable to use the Component Business Model (CBM) to formulate this unifying representation of the enterprise.

Co-pending U.S. patent application Ser. No. 11/176,371, entitled "System and Method for Alignment of an Enterprise to a Component Business Model", filed on Jul. 8, 2005, the contents of which are herein incorporated by reference, provides a system and method for representing a business with a component business map. The Component Business Model (hereinafter "CBM") represents a target state of the business, arraying the components by competency and by management level, where each component is a group of cohesive business activities within a competency, and each competency is a non-overlapping partition of the activities of the business. CBM provides a logical and comprehensive view of the enterprise, in terms that cut across commercial enterprises in general and industries in particular.

The CBM as described in the above-referenced patent application is based upon a logical partitioning of business activities into non-overlapping managing concepts, each managing concept being active at the three levels of management accountability, namely providing direction to the business ("direct"), controlling how the business operates ("control"), and executing the operations of the business ("execute"). The term "managing concept" is specially defined as described in the above-referenced foundation patent and is not literally a "managing concept" as that phrase might otherwise be understood in the art.

As taught in the foregoing application, a managing concept is constructed by reference to a specified asset of the business and how that asset may be leveraged for the purposes of the business. A managing concept defines how an instance of an asset is controlled and coordinated within an enterprise. A managing concept is embodied by one or more mechanisms used to do something commercially useful with the asset, such as contain, operate, administrate, or maintain the asset, organize and control the handling of the asset within the enterprise, direct the sourcing, deployment and assessment of the asset, and determine how the asset is defined and operated.

For the purposes of the present invention, as for the related invention, the term "managing concept" is the term associated with the following features of the partitioning methodology. First, the methodology is a partitioning of the whole into necessarily non-overlapping parts. Second, the partitioning process works best when addressed to an asset of the business, where the asset can be further described by attributes. Third, the managing concept must include mechanisms for doing something commercially useful with the asset. For a sensibly defined managing concept, these mechanisms must cover the full range of management accountability levels (i.e., direct, control and execute). Managing concepts are further partitioned into components, which are cohesive groups of activities. The boundaries of a component, which are logical and not physical boundaries, usually fall within a single management accountability level.

In accordance with the teachings of that co-pending, patent application, an enterprise component map is built, representing all businesses and serving as a basis for industry component maps and business component maps. The enterprise component map is partitioned into non-overlapping managing concepts, where each competency is formed of one or more of the managing concepts. Overlays of the current state of the business upon the component map are then used to determine differences between the component map and the current state of the business. The differences can be prioritized for implementing changes to effect alignment of the business to the high priority components of the business map.

Businesses need to transform, almost continuously, as their environments and markets change. Methods, tools and techniques to support business transformation have become increasingly important. This applies to all enterprises, whether in the public sector or the private sector, and applies to for-profit and non-profit businesses alike. Goal-driven business transformation initiatives are often developed and managed in a top-down manner, i.e., they stem from enterprise-wide analyses of business objectives and are assigned to specific organizations and lines of business. In order to manage these initiatives, the business usually considers a collection of strategic options, prioritizes them, and develops investment strategies for deciding which ones need to be funded. In summary, from a top-down perspective, a business needs to manage a set of initiatives that compete for its resources.

At a more operational level, within the business a variety of portfolios need to be managed at varying levels in the enterprise. A portfolio is defined as a formally-established group of related artifacts that are managed by balancing business value and business cost. These could be portfolios of application programs, hardware systems, projects, and many other kinds of assets or resources. The individual portfolios are often developed and managed in a bottom-up manner, i.e. in a localized context with limited consideration of enterprise goals and of other portfolios.

The Component Business Model (CBM) approach decomposes the entire enterprise into discrete business components. The business components are constructed carefully to integrate functional, organizational and technical aspects of the business and a Component Business Map is created for a specific business. The Component Map goes through a process of thorough rationalization and validation to ensure that it truly provides a view of the entire business. A well-constructed Component Map provides an organizing framework for many of the decisions that a business needs to make. The value of CBM is that it provides an organizing management arguments can be projected.

Enterprise Portfolio Management requires effective integration of the cost-value trade-offs that individual portfolio managers, lower down in the enterprise, need to implement. As an example, a business may be pursuing three strategic initiatives, namely to make its processes more efficient, to manage its pool of skilled and expensive professionals, and to reduce the number of software applications that are required to run the business. Somewhere within the business, there are managers who will be responsible for portfolios of processes, people and applications respectively. The CBM components provide the unifying "chunks" of the business that are impacted, to varying extents, by the choices made by the individual portfolio managers. The trade-offs between the different portfolio management decisions can be viewed and analyzed at the level of CBM components that reflect the enterprise view.

It is, therefore, an object of the present invention to provide Enterprise Portfolio Management as an overall top-down business-centric solution to the problem of managing enterprise-wide business transformation through the alignment of business portfolios. The solution ideally utilizes the Component Business Model as a model, technique and tool to manage enterprise portfolios and monitor the progress of strategic initiatives.

It is another object of the invention to provide a method and system to analyze, plan, and control the transformation of a business, interacting with and collecting information from portfolios of applications, systems, projects, and other resources that affect the people, processes and technology that comprise business solutions.

Another object of the invention is to facilitate analysis of business value and realization cost, resulting in a prioritized set of recommendations optimized to the constraints and requirements of the enterprise.

It is another object of the invention to provide a common view of the enterprise based on Component Business Modeling (CBM) as the organizing framework, tailored to the enterprise, for all aspects of portfolio management.

Yet another object of the invention is to realize an Enterprise Portfolio Management Hub and methods for creating and maintaining a portfolio model at the Hub for use in dynamically analyzing business transformation decisions.

SUMMARY OF THE INVENTION

The foregoing and other objects are realized by the present invention wherein an Enterprise Portfolio Management Hub (hereinafter, "EPMH",) comprising a middleware server and a client interface, is provided as middleware between a user and the existing portfolio applications, tools, and systems at the enterprise. Central to the EPMH is the Component Business Model, which enables an organizing framework and enterprise management capabilities. Data from different portfolios in the enterprise are integrated within CBM components and evaluative techniques are applied to generate at least one portfolio model. The EPMH server interacts with the various portfolio managers that exist within the business, querying them for critical information and aligning the information provided to support business goals. In addition to accessing data from one or more portfolio management tools, data may be entered directly into the EPMH tool by the end user. The resulting enterprise portfolio model is an integrated view of heterogeneous portfolios which facilitates the identification and evaluation of projects that have business value. This information is presented at the client interface. Based on client request input, the EPMH analyzes projects by evaluating their potential against business risks and costs and generates a feasible set of solutions that balances the competing objectives of different disciplines within the enterprise.

The Enterprise Management Portfolio Hub allows a user to perform enterprise portfolio management activities from a single point of control. EPMH relates information, analysis, display and control based on the organizing concept of the business components that comprise the CBM map of the enterprise. It allows the user to interact with or access information from various Portfolio Management applications and services. EPMH supports evaluative techniques that can be used to identify areas for business transformation and to generate transition plans.

BRIEF DESCRIPTION OF THE DRAWINGS

The invention will now be described in greater detail with specific reference to the attached drawings wherein.

DETAILED DESCRIPTION OF THE INVENTION

Figure 1:
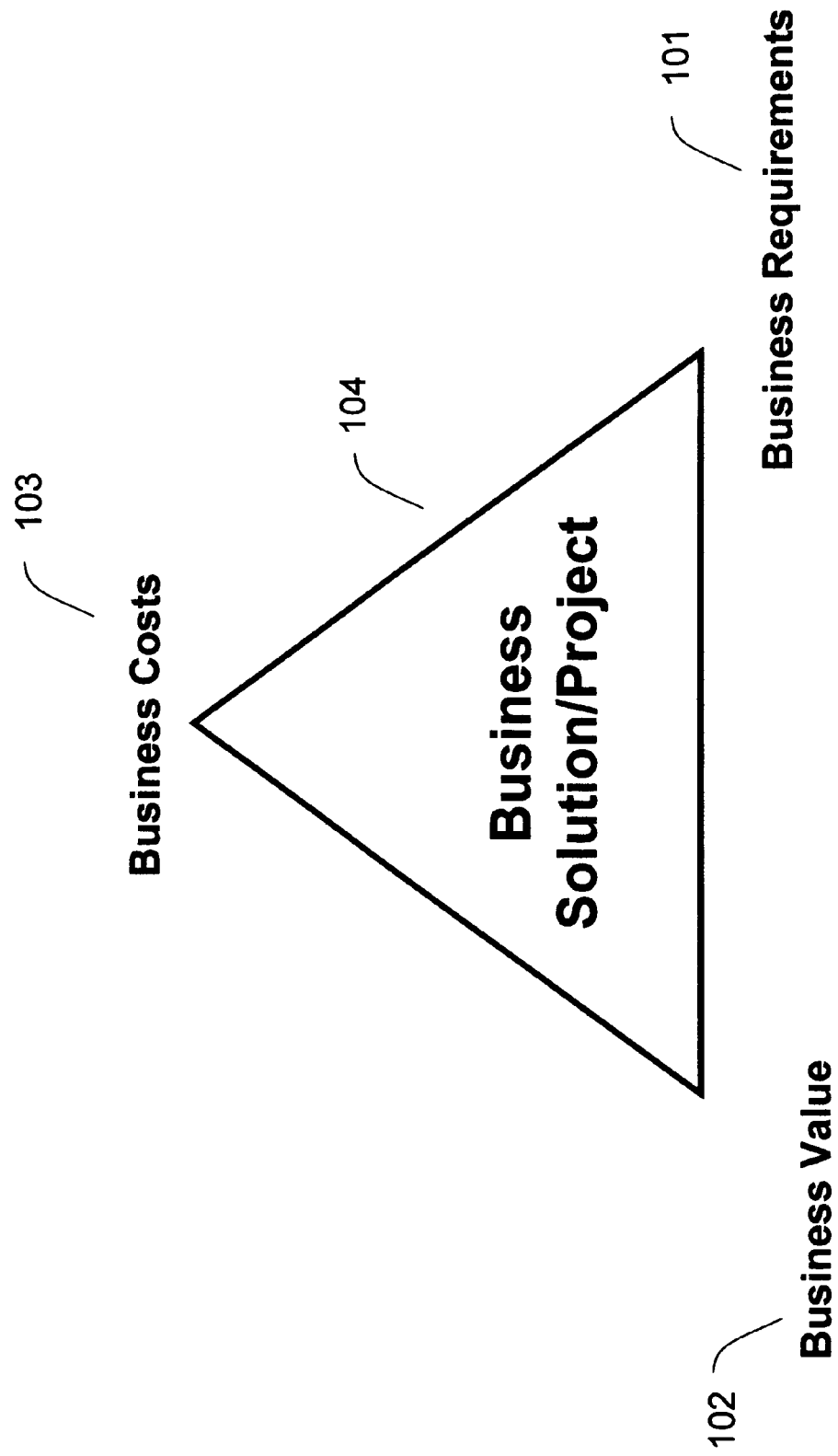
FIG. 1 provides a schematic representation of the CBM approach to providing a business solution.

The present invention provides a system, middleware, and methods for enterprise portfolio management making use of the Component Business Model (CBM) approach to integrating varied business inputs to provide a view for arriving at business solutions. As schematically illustrated in FIG. 1, for portfolio management, business requirements 101, business value 102, and business costs 103 must be provided for a given business project 104. All of these inputs are needed to perform an analysis and to provide a recommendation for enterprise portfolio management. Business requirements 101 represent strategic business initiatives or goals. Business values 102 are the benchmarks, key performance indicators and objectives a business transformation should achieve. Business costs 103 are determined as a factor of many considerations, including the "as-is" state of the enterprise as well as the desired state. To analyze and identify an enterprise portfolio management solution, information provided by multiple portfolio managers and services within the enterprise must be consulted.

Figure 2:
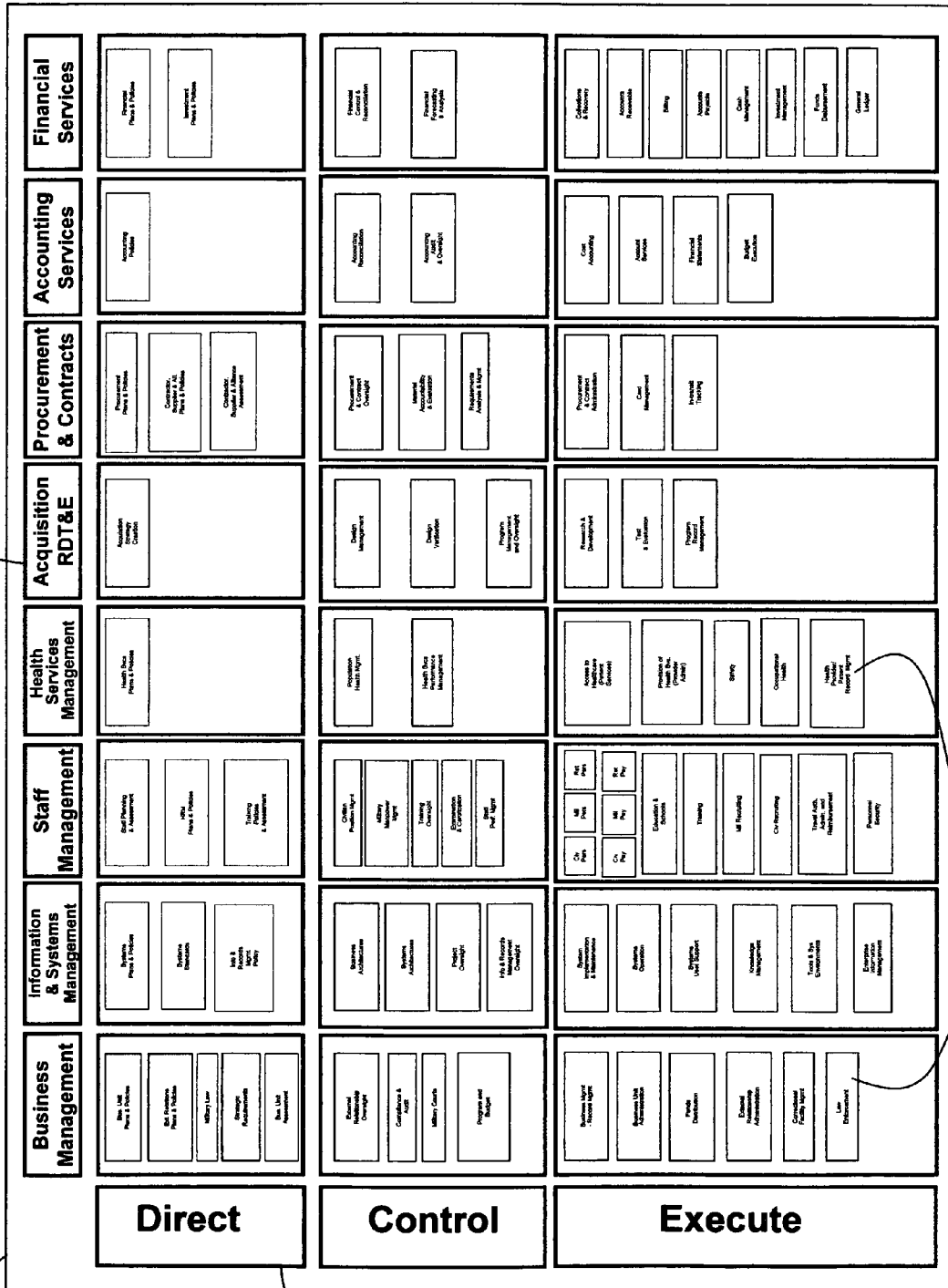
FIG. 2 illustrates a component business model (CBM) map generated in accordance with the co-pending patent application

As discussed above, as well as in the co-pending patent application Ser. No. 11/176,371, for "System and Method for Alignment of an Enterprise to a Component Business Model", which has been incorporated by reference herein, a CBM map provides a view for evaluating business value 102 by decomposing an entire enterprise into discrete business components that collaborate. The CBM components are described in terms of people, processes and technology and the CBM map is an assemblage of all of the components of the enterprise. FIG. 2 is a representative CBM map 200 with columns 204 of components 210 mapped therein. Each column 204 represents a business competency, for example, Staff Management or Accounting Service, with the components for that competency listed in the column. As shown representatively, components for the Accounting Services include Accounting Policies, Accounting Reconciliation, Accounting Audit & Oversight, Cost Accounting, Account Services, Financial Statements, and Budget Execution. The components are placed within the columns according to the Management Level Accountability Categories 202 of Direct, Control and Execute, effectively mapped as rows of the CBM.

Using the CBM map, the CBM method analyzes the underlying activities and attributes of components to determine business transformation opportunities. CBM provides a natural way to decompose a large enterprise into a manageable set of components (generally, 60 to 90 in number) that can be used by an analytic tool. The present invention utilizes a two-phase approach to mapping relevant portfolio features into a portfolio model for analysis. The first phase involves analysis of the dependencies between the elements of portfolios with each other and with the CBM map. For example, with reference to FIG. 3, in an enterprise where three portfolios exist, one for applications 316, one for systems 317 and another for projects 319, elements of each portfolio may relate to one another forming a portfolio model 308. Furthermore, these elements may relate to CBM business components (e.g., 304). For example, each application will impact a set of business components 210 and vice versa. The dependencies and relationships are established by analyzing the portfolios as well as by client input. The second phase comprises mapping the dependencies and relationships resulting in a CBM map 306 of the enterprise, annotated with the information and relationships contained in the portfolio model 308.

Figure 3:
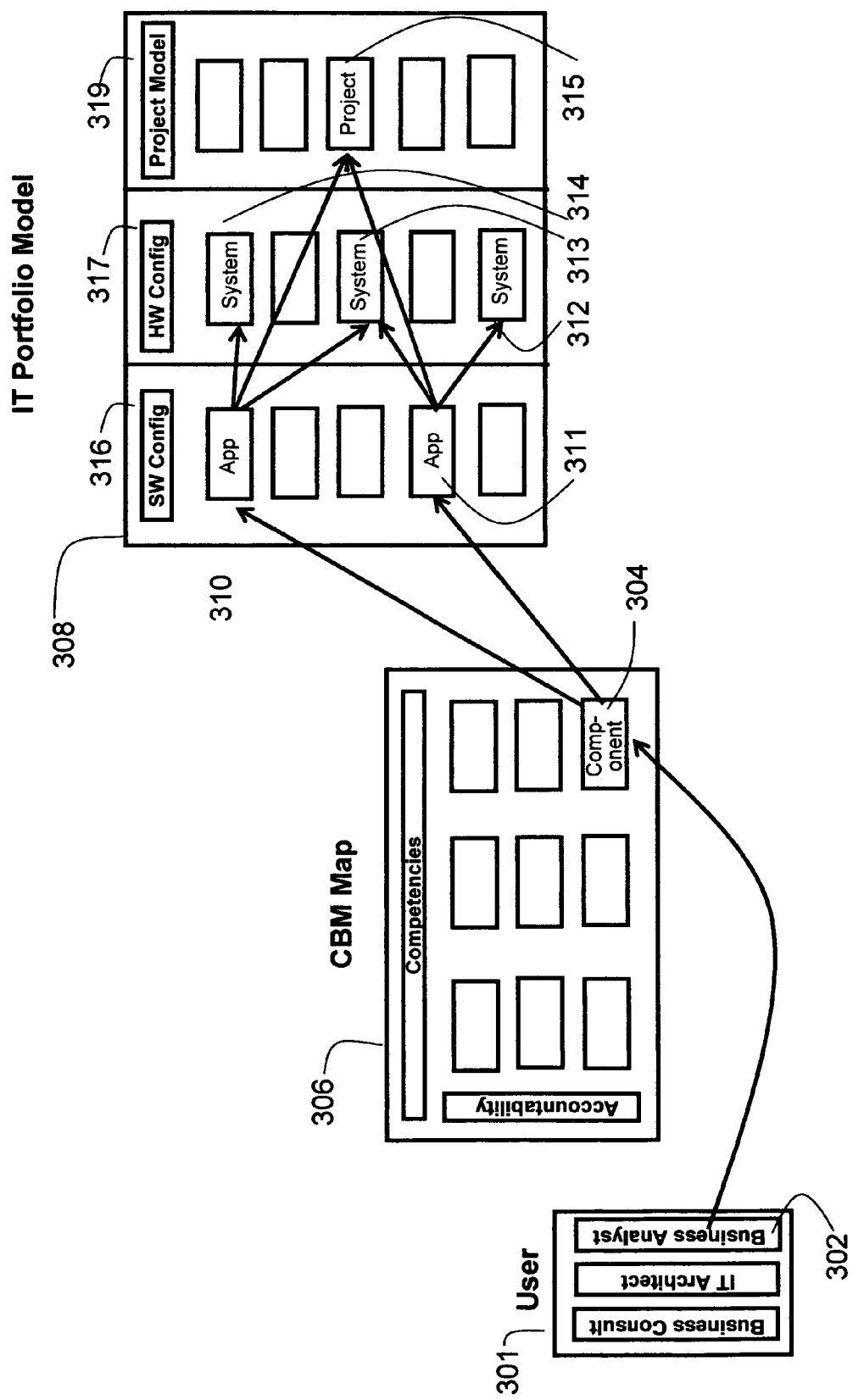
FIG. 3 is a block diagram illustrating CBM as it relates to the portfolio model generated in accordance with the present invention.

FIG. 3 provides a schematic illustration of how the CBM map relates to the portfolio model of the present invention. While the prior CBM approach broke the enterprise down into components with activities, the present portfolio approach further integrates existing Portfolio Management ("PfM") tools, including software applications, hardware systems, and projects, all of which already perform some aspect of portfolio management for the enterprise. A portfolio model 308 is generated with the enterprise portfolio management features and the user's view will include a mapping of the applications, systems, and projects which are associated with the activities of the respective CBM component 304 being viewed. Applications and services manage specialized aspects of PfM. The figure at 308 shows three such PfMs managers including an Application Portfolio Manager 316 that controls software applications and services such as 310-311, an IT System Portfolio Manager 317 that oversees hardware such as 312-314 representing such hardware assets as computers and networks, and a Project Portfolio Manager 319 which organizes and monitors PfM projects (e.g., 315) to support business transformations. Each of the managers supports some aspect of a business transformation and each has a dependency on at least one other PfM feature. For example, software may have prerequisites on hardware and both require project resources to perform modifications. This chain of interconnections is organized by the EPMH within the CBM interface.

As illustrated in FIG. 3, when a user at a client location 301, such as a business analyst 302, accesses the inventive system and method, the user can view an application portfolio through the lens of a CBM component 304 on CBM map 306, used as before to evaluate business value, and will additionally be shown the relevant enterprise features, 310-315, in the portfolio model 308 which are mapped to that component and which can influence the calculations of business value, business cost and risk. The enterprise features of the portfolio model will be considered when calculating costs, value and risks for respective new projects, as further detailed below. CBM provides the organizing framework by mapping PfM information to CBM components. The PfM interface accessed by the user through the EPMH is a representation of the CBM map of the enterprise upon which PfM information in encoded. By selecting visual elements of the CBM map, the user can "drill down" to obtain detailed information about aspects of PfM and, further, reach specialized PfM applications and services that manage selective parts of the business in context.

Figure 4:
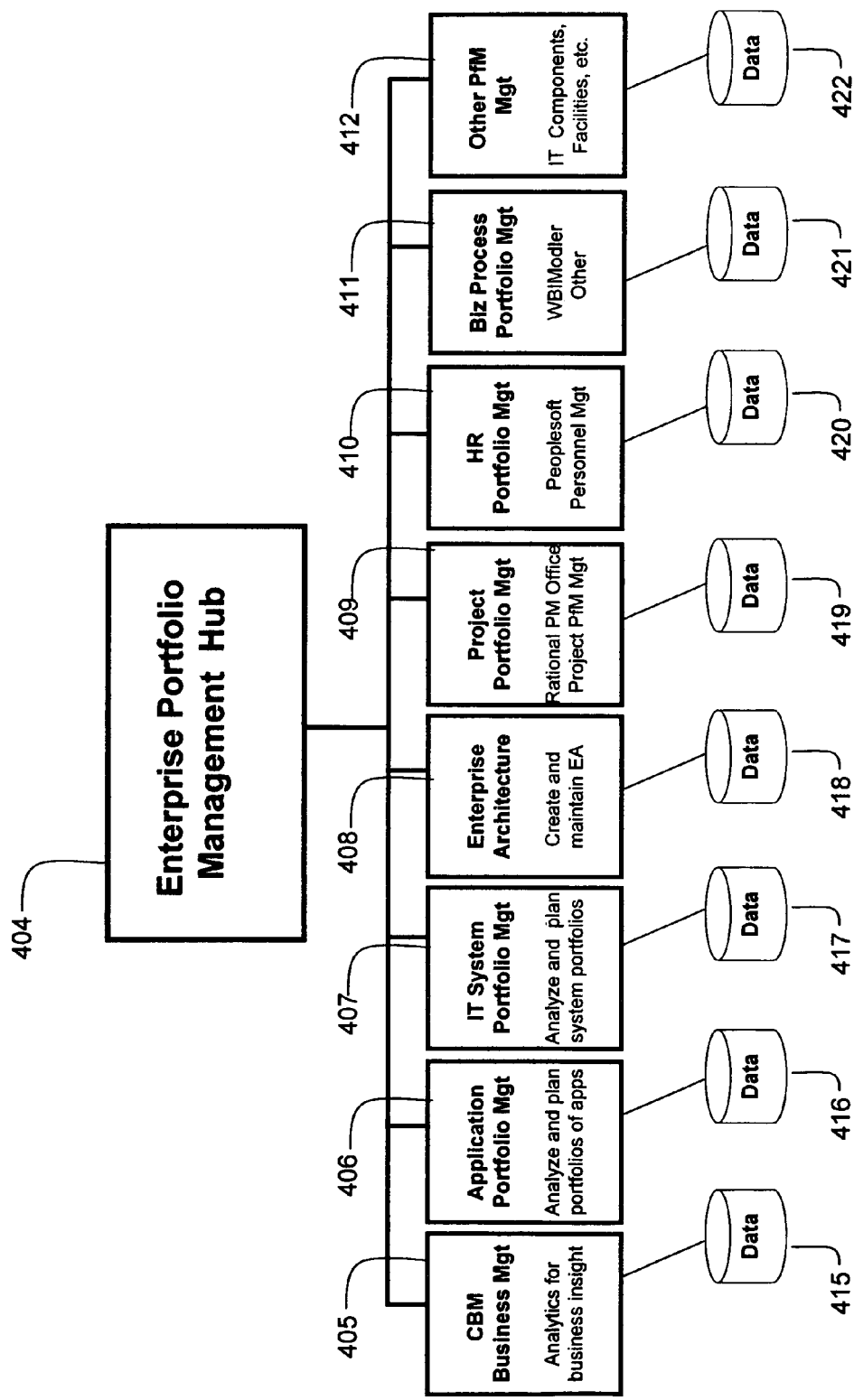
FIG. 4 is a block diagram showing the enterprise portfolio management hub (EPMH) as middleware between users and the enterprise systems, tools and applications.

FIG. 4 is a block diagram showing the Enterprise Portfolio Management Hub (EPMH) as middleware, preferably at an EPMH server, acting as an intermediary between users and the enterprise portfolio management tools. Users, such as executives, information technology architects, and business analysts, use the EPMH tool from a client location 402 which has been provided with the EPMH software. Using the EPMH client the user at 402 can then interact with the EPMH middleware server which provides centralized function services such as portfolio data management and mapping. The middleware is ideally provided at an enterprise server, but may also be installed at the client location or at a remote server. The EPMH 404 gathers information, referred to herein as portfolio management features (shown as 310-315 of FIG. 3), from the various portfolio management tools 405-412 that exist for performing some aspect of portfolio management for the enterprise. As illustrated in FIG. 4, the enterprise may have existing tools, such as (but not limited to) an existing CBM Business Management Application 405, an Application Portfolio Management tool 406, an IT System Portfolio Management tool 407, an Enterprise Architecture tool 408, a Project Portfolio Management tool 409, a Human Resources Portfolio Management tool 410, a Business Process Portfolio Management tool 411, and other Portfolio Management (PfM) tools, collectively illustrated as 412. Each of those existing portfolio tools may include portfolio management features as part of the management tool or associated with the tool and accessible from data stores, illustratively shown as 415-422. Each of the portfolio management tools specializes in managing and controlling parts of the enterprise and can affect people, process and technology. Typically, the portfolio management tools are partitioned and disjoint. The portfolio management features may be dedicated to a single tool or may be duplicated across different portfolio management tools.

The EPMH collects portfolio information from the existing portfolio management tools 405-412 and maps the information contained in the PfM tools and their features in a portfolio model 408. The EPMH may query the PfM tools to obtain the information, and may periodically re-issue the queries to ensure that updated information is integrated into the portfolio model or may be configured to receive asynchronous messages containing PfM information that is initiated from the PfM managers. The portfolio model provides a means of joining the limited PfM views into a complete mosaic required to make effective portfolio management decisions. With regard to the information in the data stores 415-422 of the PfM tools, that information must be accessible to the EPMH and may be aggregated (virtually, with pointers, or physically) into a single data store (not shown) supporting enterprise-wide portfolio management. The EPMH identifies resources, including, but not limited to, systems, applications, assets and projects.

Figure 5:
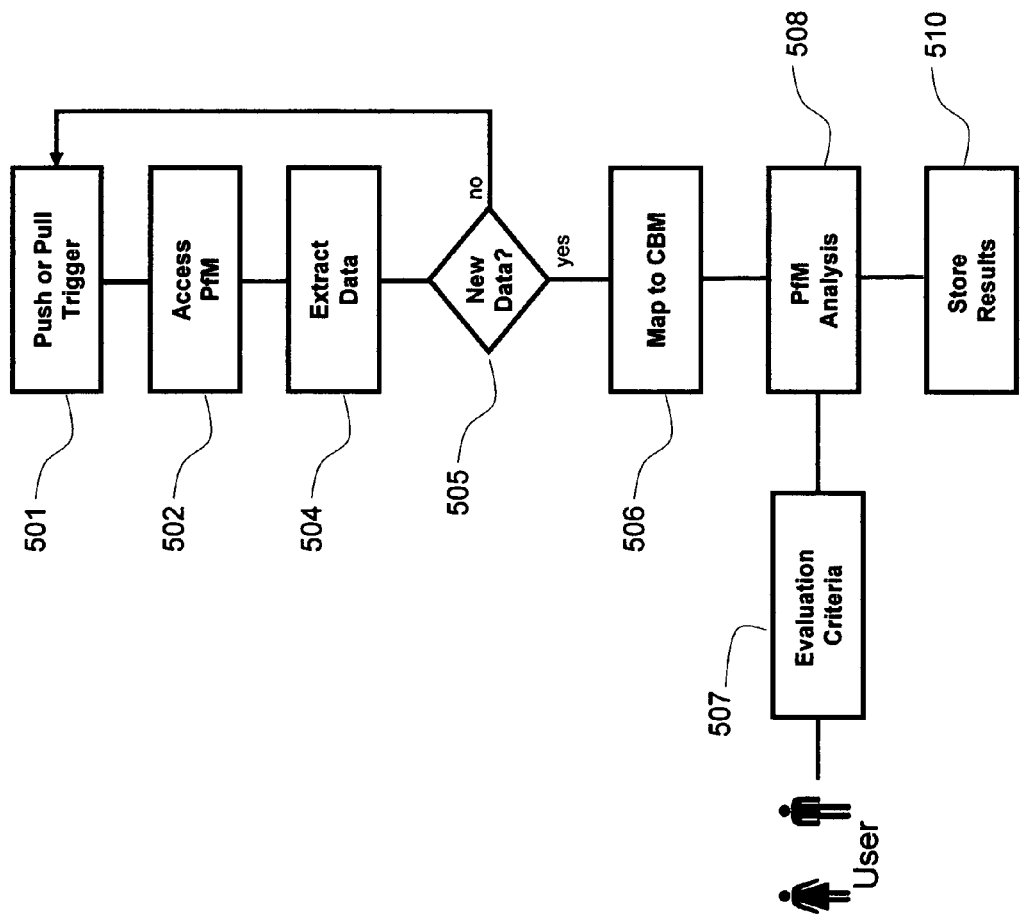
FIG. 5 is a process flow of one method implemented by the EPMH of the present invention for creating a portfolio model.

FIG. 5 is a process flow of one method implemented by the EPMH of the present invention for creating and updating a portfolio model. At 501 EPMH is initiated to construct or refresh a portfolio model. This action may be structured as push or pull triggers, scheduled at time intervals or as asynchronous events. At 502, the EPMH accesses or receives information for use in creating the portfolio model. The information may be obtained in one or a variety of ways, including entry by a user or automatic entry from a spreadsheet or from a PfM tool of the enterprise. As noted above, the EPMH may query the PfM tools initially and may further poll them at regular intervals to ensure that the portfolio model contains the most recent information about the PfM tools It is envisioned that the PfM tools could, alternatively, be modified to report any updates and changes to the EPMH; however, it is desirable to provide enterprise portfolio management without the need to modify existing PfM tools. At step 504, the EPMH obtains portfolio management feature information from the PfM tool. If the feature information is not new, as determined at decision box 505, the EPMH makes no changes to the portfolio model and returns to wait for the next update period or event. When feature information has been obtained at 504, and has been determined to be new information, at decision box 505, that information is used to update the portfolio model and is mapped into the CBM model at step 506. Once all information has been mapped in the CBM model, if a user request is received, as determined at 507 the EPMH may perform a portfolio management analysis. This analysis employs user specified criteria which contains business requirements, business value and business costs required to calculate a set of portfolio management solutions at step 508. These calculated business solutions are provided at step 508. Provision of results of the calculated solutions may include one or both of reporting the results to the user and storing the results.

When evaluating proposed new projects, discussed below with reference to FIG. 9, the EPMH may access the stored solutions for existing projects for comparison to a calculate portfolio management solutions for proposed projects. Mapping from an element of one portfolio to an element of the same or another portfolio allows modeling of various types of relationships. There can be functional dependencies between two portfolio elements, for example, if Application A requires application B to perform its function. Resource dependencies can exist, such as when two projects require the same human resource. Schedule dependencies will clearly exist. Redundant overlap may exist between two portfolio elements in terms of business benefits. The portfolio model captures the various dependencies.

Figure 6:
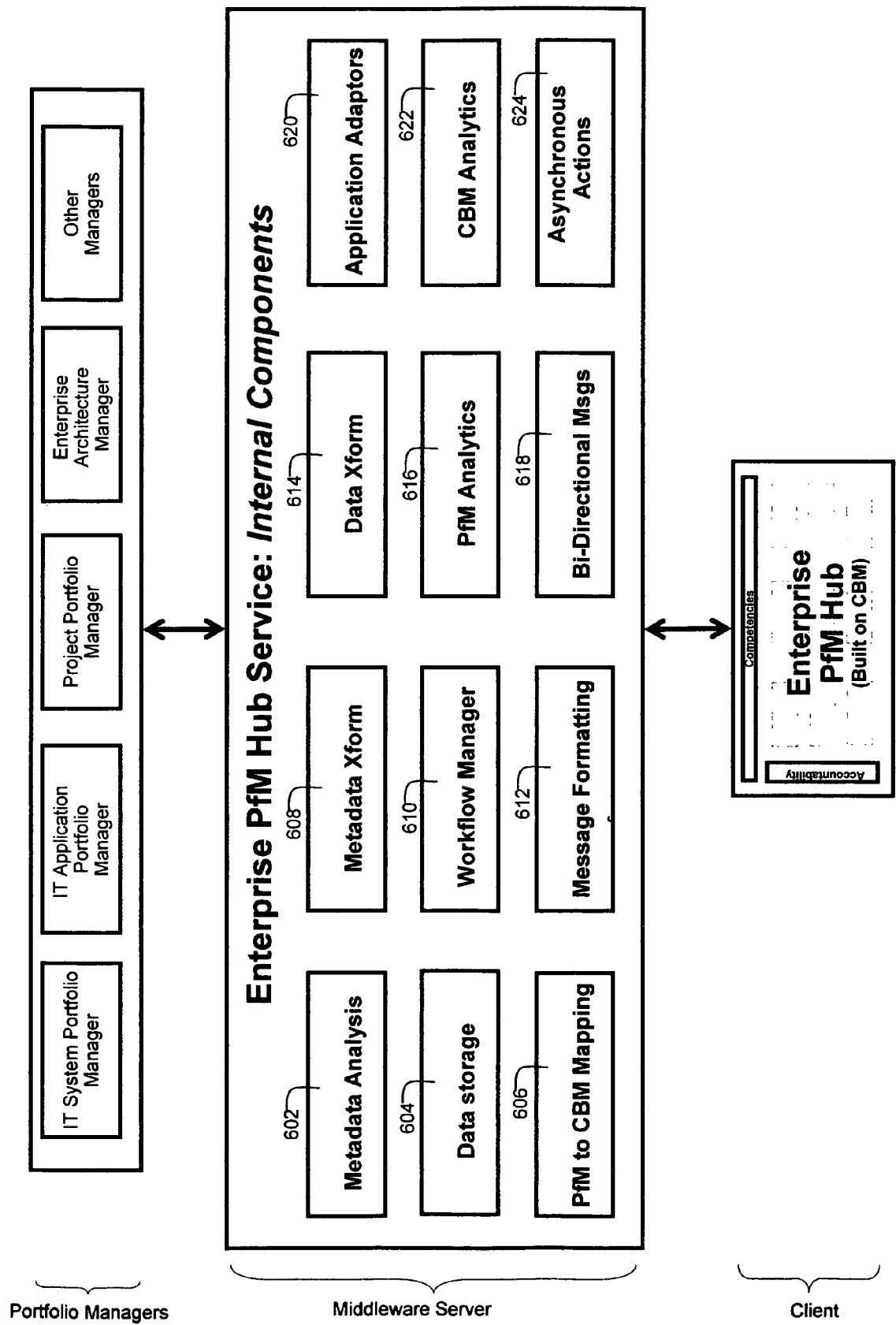
FIG. 6 is a block diagram illustrating one embodiment of the EPMH middleware service components.

FIG. 6 is a block diagram illustrating one embodiment of the service components comprising the EPMH middleware. Essentially the EPMH Hub provides a PfM application and service integration layer, illustratively including Metadata analysis 602, Metadata Transform 608, Data Transform 614 and Application Adapters 620, a PfM Hub services layer, illustratively including Data Storage 604, Workflow Manager 610, PfM Analytics 616 and CBM Analytics 622, and an EPMH client services layer illustratively comprising PfM to CBM Mapping tool 606, Message Formatting tool 612, Bi-Directional Messaging component 618 and Asynchronous Actions component 624. It is to be understood that the invention is not limited to the illustrated components, which are provided as representative of functionality to be provided at the EPMH.

The PfM data, including information obtained from PfM tools, including applications, services and data stores that reside within the enterprise are accessed, analyzed, mapped and stored in the in the EPMH middleware server (not shown). To access information provided by the PfM applications and services, Application Adapters (620) define and facilitate the communication connection and transfer of data. When the data is received, it is parsed by the Metadata Analysis component (602) which understands the syntax and structure of the data. Having analyzed the data, it is then run through a Metadata Transformation component (608) which transforms the data structure used by the PfM tools into that which understood and used by the EPMH. Using the metadata model as a guide, complex relationships among PfM data and the underlying CBM model are made by the Metadata Transform component (608). The data is transformed into a normalized form by the Data Transformation component (614). Finally, the PfM to CBM Mapping component (606) relates and integrates the PfM data into the CBM map forming a portfolio model for the enterprise. The information and relationships that have been transformed and mapped are stored in the Data Storage component (604). EPMH uses the information in the Data Storage component to present PfM data and relationships to the user and to enable enterprise portfolio management analyses. Data storage 604 may additionally provide virtual storage of PfM data pointers to the data stored in 415-422 of FIG. 4 or physically store all of the PfM data.

In addition to the components that support the creation of the portfolio model, the middleware may include: a PfM Analytics component (616) for analyzing costs and benefits related to portfolio management solutions; a CBM Analytics component (622) for analyzing the effectiveness and viability of the enterprise to that of business strategy, determining "hot spots" of business concern; and a Workflow Manager component (610) that drives the collaborative process for performing EPM among various role players and technology.

The EPMH Middleware service also enables several components that facilitate communication with the EPMH client. These may include a Bi-Directional Messaging capability (618) which supports two way communication between the server and client; a Message Formatting service (612) that constructs and decodes messages between the server and client; and a component to handle Asynchronous Actions at 624, which allows the server and client to operate multiple, concurrent, long running and asynchronous communication threads.

Figure 7:
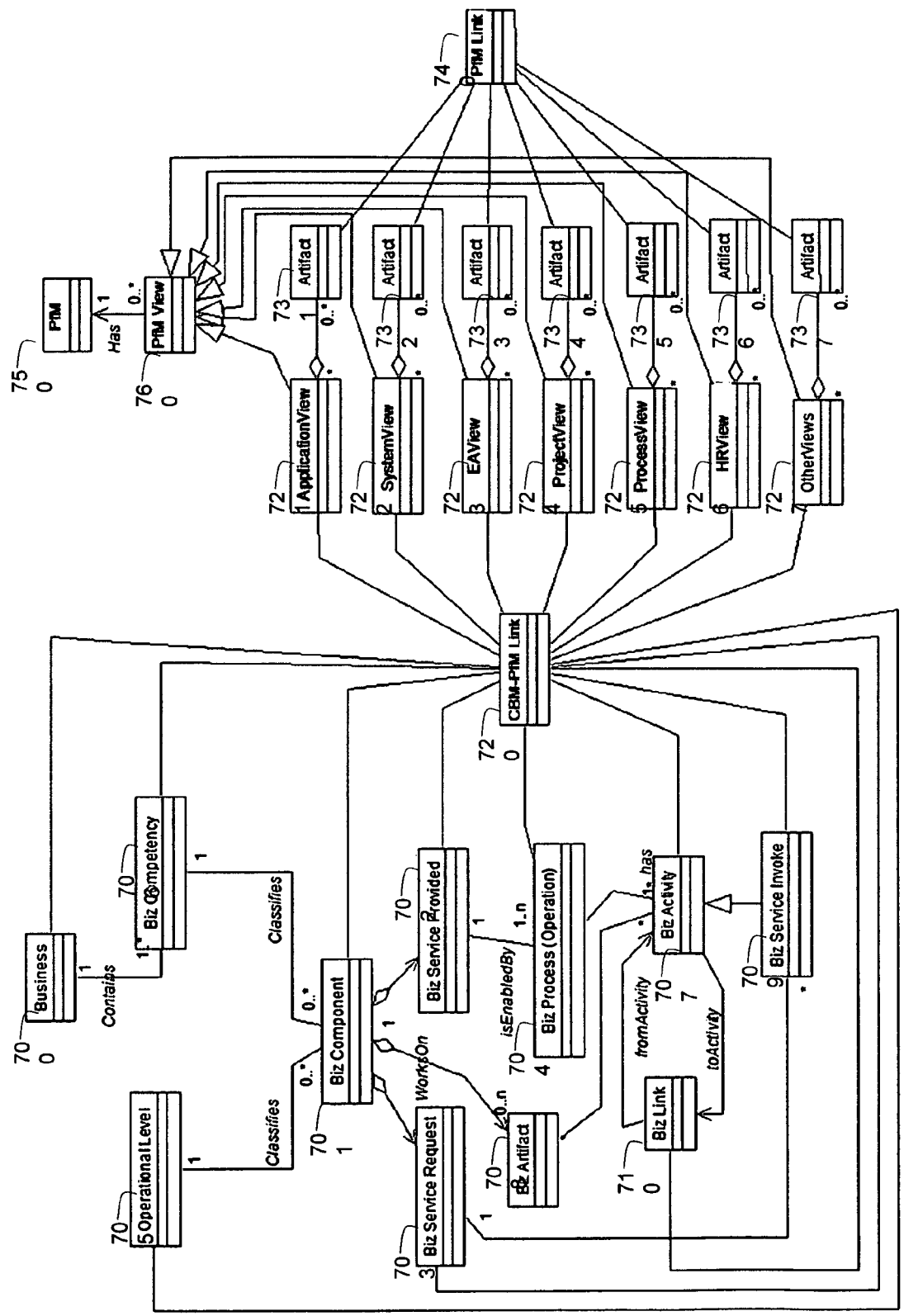
FIG. 7 illustrates a representative metamodel of the logical flow for the EPMH in creating the portfolio model.

FIG. 7 illustrates a representative metamodel that EPMH uses in creating the portfolio model for a business 700. A business component 701 is a well-bounded piece of the enterprise that can be a business in its own right. It includes the resources, people, technology and know-how necessary to deliver the business value. The operational level 705 and business competency 706 are derived in the CBM analysis. A business service provides some well-defined value that a business component offers to other business components and/or to external parties provided at 702 in response to request 703. A business operation 704 describes what the business actually does and consists of business artifacts 708, business activities, shown as nodes at 707, which operate on the business artifacts 708, and the topology of connections between the business activities and the resources, people and technology that support the activities. A business activity 707 is something that the business does at a level of granularity that is chosen by the business. For example, an order processing service may consist of three business activities performed in sequence: create order, validate order and place order. The business link 710 establishes an ordered relationship among business activities. A business artifact 708 is a concrete identifiable chunk of business information such as forms, documents, and messages. The illustrated business service invocation 709 represents a business activity that requires a business service to be invoked. The CBM-PfM link at 720 provides the association needed to tie multiple PfM views 721-727 to CBM elements previously described. The PfM views 721-727 represent the various applications or services (shown as 405-412 in FIG. 4) that manage the resources in the enterprise portfolio. Each PfM artifact 731-737 is a structure that facilitates a normalized view of enterprise PfM information obtained from those various applications or services (shown as 405-412 in FIG. 4) that manage resources in the enterprise portfolio. The PfM link 740 provides the association needed to tie multiple PfM artifacts together when they apply to a related project that spans across multiple resources. The basic definition of a portfolio, its data and methods are established in the PfM object 750. The basic definition of the view characteristics of a portfolio is established in the PfM view 760 which is an extension of the PfM Object. Each portfolio presents its type of information in a PfM View 760. In turn, PfM views 721-727 represent specialized portfolio information and are themselves extensions of the generic portfolio view.

Figure 8A:
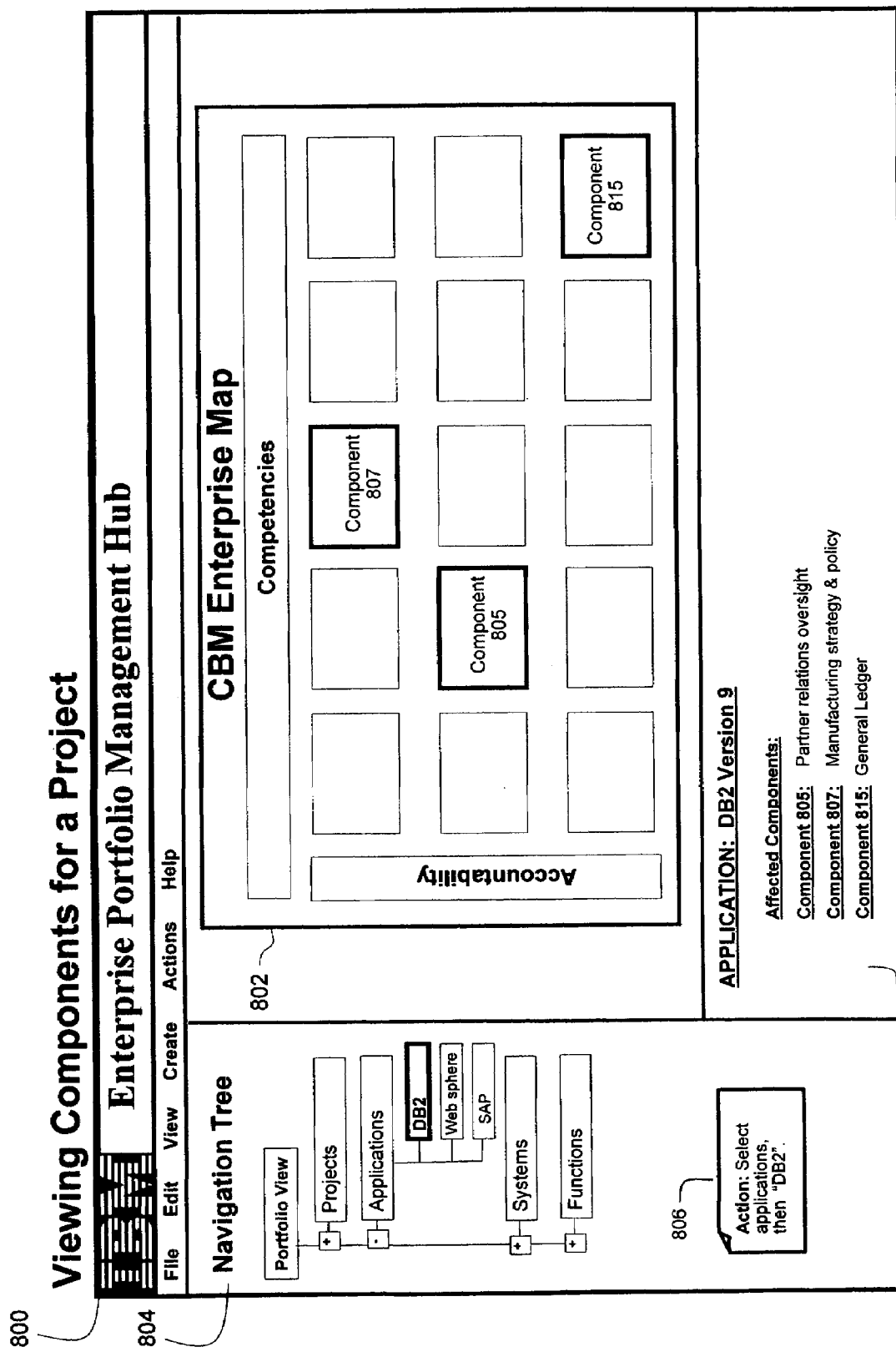
FIGS. 8A and 8B are representative screen shots of the graphical user interface generated by the EPMH.
Figure 8B:
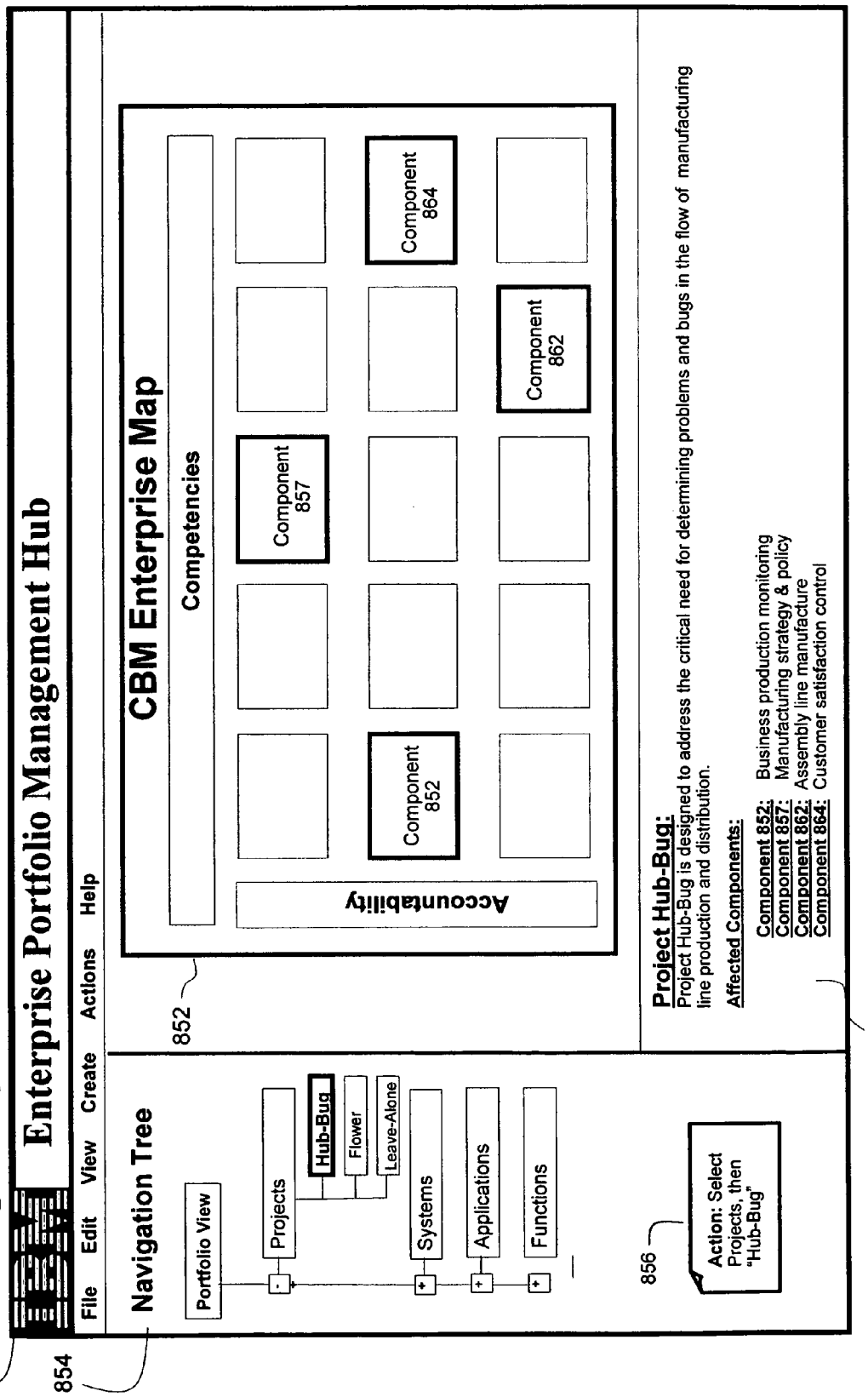

FIGS. 8A and 8B are representative screen shots of the graphical user interface (GUI) presented to the user at a client location for interacting with the EPMH. In FIG. 8A, the display 800 includes a CBM Enterprise Map at 802 including a plurality of components 805, 807 and 815, a Navigation Tree at 804, including an action/instruction box 806, and an annotation section 801. Assuming the user has selected to view or query an application portfolio view, and specifically the DB2 application portfolio view, then the EPMH generates and displays a CBM Enterprise Map 802 showing the business components that are affected by the DB2 application. In the annotation box 801, the EPMH displays details regarding the affected components, indicating that component 805 partner relations oversight, manufacturing strategy and policy at component 807, and the general ledger component 815 will all be affected by any change to the DB2 application.

An alternative GUI, 850, shown in FIG. 8B, is generated in response to user selection, at Navigation Tree 854 of the project portfolio view related to the Hub-bug project, as indicated in action box 856. The EPMH generates and displays the CBM Enterprise map 852 highlighting the components that would be affected if the Hub-bug project were to be terminated. Annotation box 851 provides detail including a description of Project Hub-bug and the affected components 852, 857, 862 and 864.

Figure 9:
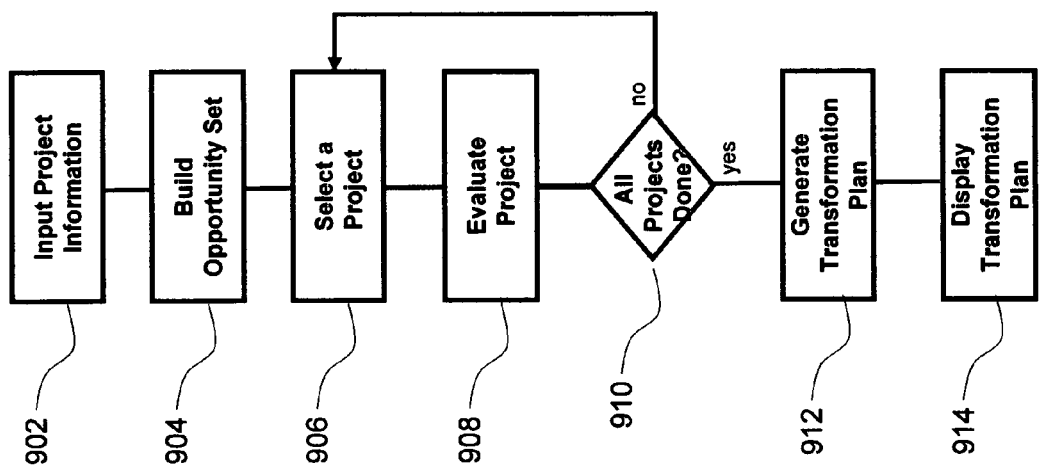
FIG. 9 is a process flow of one implementation of the portfolio analysis by the EPMH of the present invention.

FIG. 9 provides a process flow of one implementation of the portfolio analysis performed by the EPMH in response to user input at the Navigation Tree. At step 902, the EPMH receives input, for example input from the user for a proposed project. The EPMH creates an opportunity set at step 904. The opportunity set may include both proposed new projects as well as current projects, which have already been evaluated by the EPMH and for which calculated business solutions may have been saved (steps 508 and 510 of FIG. 5). Each project in the opportunity set is selected, at step 906, for evaluation by the analytic components of the EPMH. Evaluation at step 908 is performed, as will be further detailed with reference to FIG. 10 below, representatively by the CBM analytics to determine business value and by the PfM analytics to determine costs. For current projects, the EPMH may rely on previously calculated business solutions (values and costs), or may re-evaluate the projects with the understanding that some relevant factors may have changed since the last evaluation in which the input at 902 comprises the new and/or changed factors. Once evaluation results have been obtained for every project in the opportunity set, as determined at decision box 910, the EPMH analyzes the results and generates a feasible transformation plan or feasible transformation plans based on the analysis at step 912 and then displays the transformation plan or plans on the CBM map at step 914. A Plan Report (not illustrated) may additionally be generated and provided to the user in electronic form or hard copy.

Figure 10:
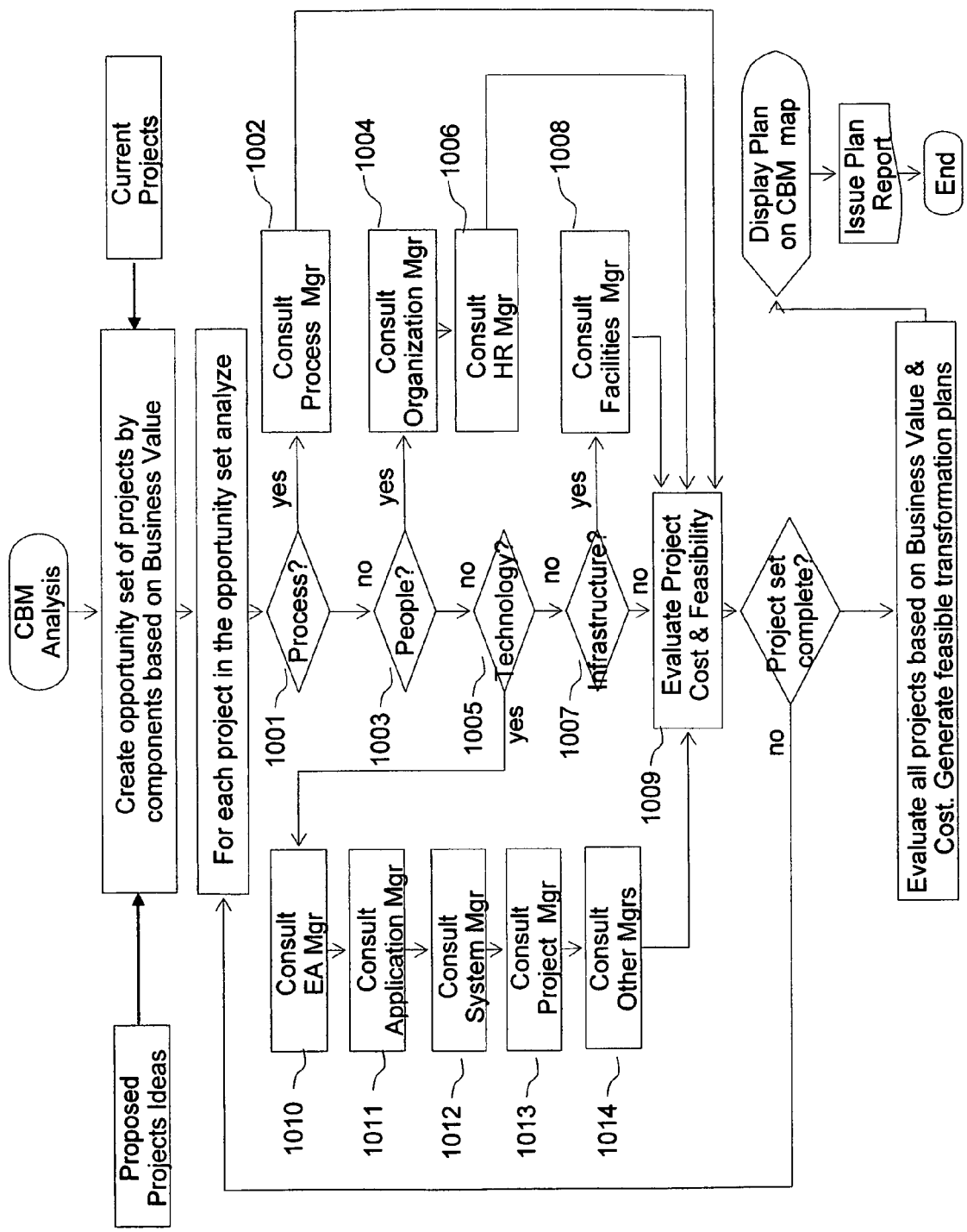
FIG. 10 is a process flow illustrating one implementation of the project evaluation step of FIG. 9.

FIG. 10 is a process flow illustrating one implementation of the project evaluation step 908 of FIG. 9. Alternative project evaluation techniques can be applied. For each project in the opportunity set, the EPMH endeavors to derive a business value for transformation and to provide a description of business goals and measures to be met for the transformation. The analysis necessarily includes an examination of people, processes, technology, infrastructure, and other considerations affecting or affected by a project. It is to be understood that the process flow is illustrative and that the invention need not be limited to the illustrated order of the analytic steps. As illustrated, the CBM analytics first determines if it is a process that is being evaluated at step 1001. If a process is involved, at step 1002, the EPMH consults the Process Portfolio Management tool, shown at 411 of FIG. 4, to examine the PfM applications and services to ascertain process feasibility and costs for the process project. If a process is not involved, the analytics may next determine, at step 1003, if people resources are involved.

If so, the PfM applications and services, such as an Organization Portfolio Manager, "other" at 412 in FIG. 4, and an HR Portfolio Manager, 410 of FIG. 4, would be consulted as shown in steps 1004 and 1006. In the consultation, feasibility and costs are ascertained for the people-related project. If the project does not relate directly to process or people, the EPMH may next determine if the project relates to technology at step 1005. Technology resource changes would necessarily impact multiple portfolio areas. Accordingly, the process flow preferably includes consultations 1010-1014 with various PfM applications and services, including the Enterprise Architecture Manager 408, the Application Portfolio Manager 406, the IT System Portfolio Manager 407, the Project Portfolio Manager 409, and other managers, to ascertain feasibility and to calculate costs associated with a technology project. At step 1007, it would be determined if the project related to infrastructure, assuming that the project did not relate to process, people, or technology. For an infrastructure project, such as changes to space, facilities and/or utilities, a Facilities Manager, "other" at 412, would be consulted at 1008. Based on the consultations with the relevant portfolio applications and services, the CBM analytics component arrives at a measure of feasibility or business value for the project and the PfM analytics component arrives at a project cost at step 1009. As discussed above with reference to FIG. 9, the analysis is performed for each project in the opportunity set, thereby generating a plurality of sets of business values and costs for the plurality of projects in the opportunity set.

Figure 11:
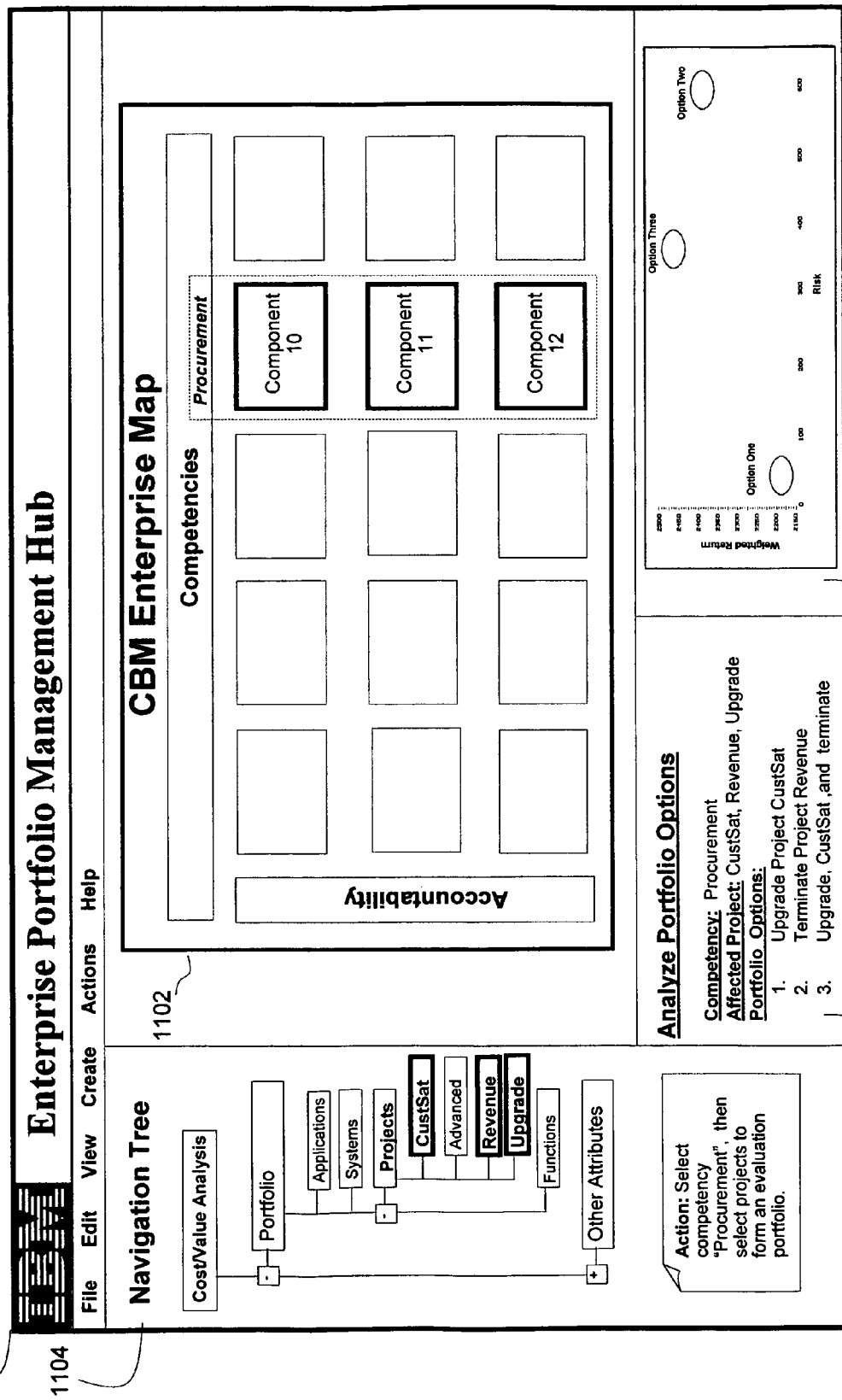
FIG. 11 illustrates a sample display generated by the EPMH with analysis results for client review.

FIG. 11 illustrates a sample display 1100 generated by the EPMH with analysis results for client review. Based on client input at the Navigation tree 1104, for an analysis of proposed projects which effect changes to CustSat, Revenue and Upgrade, the EPMH has generated a CBM Enterprise Map 1102 indicating the competencies, namely the procurement components that would be affected by the selected set of proposed projects. Further, EPMH has performed an analysis of the projects and has generated feasible transformation plans, shown under the heading "Analyze Portfolio Options" in the annotation box 1101. Further displayed is a graphical display of the aggregated return versus risk for the project options at 1108 as calculated by EPMH.

Figure 12:
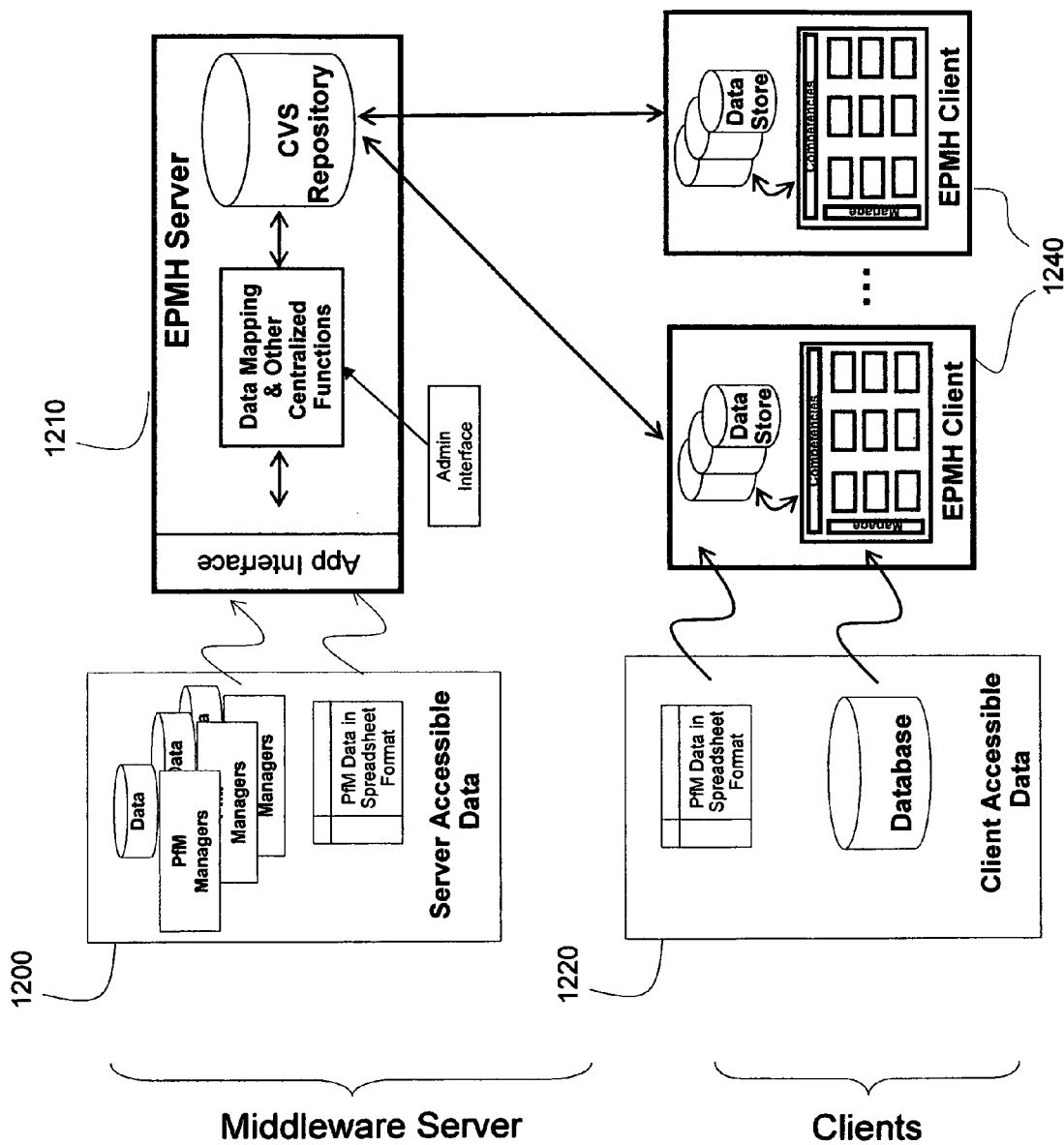
FIG. 12 illustrates an EPMH architecture for serving multiple clients in accordance with the present invention.

The EPMH server may provide services for a plurality of clients, as illustratively shown in FIG. 12. Since there are many roles and users within an enterprise that have PfM responsibilities, support for multiple clients, 1240, is provided by the EPMH server 1210. Disconnected client operations: It is presumed that not all users will be network connected, and therefore, the EPMH client can operate in a disconnected mode, using data contained in is local data store. Repository/data coherence & version control can be coordinated by storing "golden" master data on the EPMH server maintained by a repository application. The EPM data store may be serialized into a flat file and exchanged between the EPMH Server and Clients under the direction of CVS. The EPMH Server also employs the CVS capability to manage EPM information updates when it is determined that PfM information has changed. The EPMH Server has sole responsibility for the acquisition and mapping of PfM data form various sources, the Server Accessible Data at 1200 as well as Client Accessible Data at 1220, and the mapping of this data into the EMF data store.

While the invention has been described in terms of a single preferred embodiment, those skilled in the art will recognize that the invention can be practiced with modifications without departing from the spirit and scope of the appended claims.

The invention claimed is:

1. A computer-implemented method for a computing device having at least one processing device for enterprise portfolio management of a business enterprise having portfolio components and a plurality of portfolio management tools comprising computer applications for interacting with portfolio information comprising the steps of:

said at least one processing device automatically generating a portfolio model that maps dependencies between portfolio information and business resources by performing the steps of:

obtaining portfolio information related to said portfolio components from said portfolio management tools;

identifying business resource information comprising a plurality of business resources, said business resources comprising at least one of systems, applications, assets, and projects, affected by each of said portfolio components;

analyzing dependencies comprising at least dependencies among business resources and dependencies between business resources and the portfolio information;

aggregating the portfolio information and the business resources information in a portfolio model wherein portfolio information is aggregated as at least one component on a Component Business Model (CBM); and generating an annotated CBM, wherein components on said CBM are mapped to resources on said portfolio model based on said dependencies;

analyzing a business project by mapping said business project into said portfolio model to automatically identify dependencies between the business project and the portfolio information and business resources; and determining a potential business value for said business project based on said analyzing by assessing business feasibility, business risk and business costs for said business project;

generating a set of alternative proposed business projects having sets of potential business values, for each of the alternative proposed business projects; and presenting said set of alternative proposed business projects to a user by display at a graphical user interface.

2. The method of claim 1 further comprising updating said portfolio model based on updated portfolio information received from at least one of said portfolio management tools.

3. A computer-implemented method for a computing device having at least one processing device for creating a portfolio model of a business having at least one portfolio management tool for managing portfolio components comprising the steps of:

said processing device performing steps of:

obtaining portfolio information related to said portfolio components;

identifying business resource information comprising a plurality of business resources affected by each of said portfolio components;

analyzing dependencies comprising at least dependencies among business resources and dependencies between business resources and the portfolio information; and aggregating the portfolio component information and the business resources information into a portfolio model to facilitate analysis of said business.

4. The method of claim 3 wherein said aggregating comprises mapping business resource information to portfolio information based on said dependencies.

5. The method of claim 3 wherein said portfolio information is aggregated as components on at least one Component Business Model (CBM) and wherein said method further comprises mapping components of said CBM to at least one resource on said portfolio model.

6. The method of claim 3 wherein portfolio information is aggregated as at least one component on a Component Business Model (CBM) and further comprising generating an annotated CBM, wherein components on said CBM are mapped to resources on said portfolio model based on said dependencies.

7. The method of claim 3 wherein said business resources comprise at least one of systems, applications, and projects.

8. The method of claim 3 wherein said obtaining comprises querying said at least one portfolio management tool.

9. The method of claim 3 wherein said obtaining comprises receiving messages from said at least one portfolio management tool.

10. The method of claim 9 wherein said obtaining comprises receiving periodic input from said at least one portfolio management tool.

11. The method of claim 9 wherein said obtaining comprises receiving updated portfolio information from at least one of said portfolio management tools.

12. The method of claim 11 further comprising updating said portfolio model based on said updated portfolio information.

13. The method of claim 3 further comprising identifying areas for business transformation based on said portfolio model.

14. A computer system for creating a portfolio model of a business having at least one portfolio management tool for managing portfolio components comprising:
    at least one processing device for executing components;
    portfolio information gathering component for obtaining portfolio information;
    resource evaluating component for identifying business resource information comprising a plurality of business resources affected by each of said portfolio components;
    processing component for analyzing dependencies comprising at least dependencies among business resources and dependencies between business resources and the portfolio information; and
    modeling component for aggregating the portfolio component information and the business resources information into a portfolio model.

15. The system of claim 14 wherein said portfolio information gathering component comprises a querying component for querying at least one portfolio management tool to provide portfolio information.

16. The system of claim 14 wherein said portfolio information gathering component comprise a receiving component for receiving asynchronous messages comprising portfolio information from at least one portfolio management tool.

17. An Enterprise Portfolio Management Hub for managing an enterprise portfolio having portfolio components comprising:
    a middleware server at a computing device having at least one processing device; and
    a client interface for providing interaction between a user and an existing enterprise portfolio management tool through a portfolio model generated for said enterprise by said middleware server,
    wherein said middleware server comprises components executable by the at least one processing device, said components comprising:
        a portfolio information gathering component for obtaining portfolio information about portfolio components;
        a resource evaluating component for identifying business resource information comprising a plurality of business resources affected by each of said portfolio components;
        an analyzing component for analyzing dependencies comprising at least dependencies among business resources and dependencies between business resources and the portfolio information; and
        a modeling component for aggregating the portfolio component information and the business resources information into a portfolio model.

18. The Hub of claim 17 further comprising at least one storage location for storing said portfolio model.

19. The Hub of claim 17 wherein said client interface provides a Component Business Map view with user selection options for accessing said portfolio model by selecting a component on said map.

20. A computer-implemented method for enterprise portfolio management of a business enterprise having a plurality of business resources and a plurality of portfolio management tools for interacting with portfolio information comprising a processing device of a computer system performing steps of:
    obtaining a portfolio model mapping dependencies between said portfolio information and business resources;
    analyzing a business project by mapping said business project into said portfolio model; and
    determining a potential value for said business project based on said analyzing.

21. The method of claim 20 wherein said determining a potential business value comprises assessing the business risk and business costs for said business project.

22. The method of claim 21 further comprising generating a set of alternative proposed business projects.

23. The method of claim 22 further comprising presenting said set of alternative proposed business projects to a user.

24. The method of claim 20 wherein said obtaining comprises gathering portfolio information from portfolio managers and creating said portfolio model.

25. An enterprise management system for managing an enterprise portfolio having portfolio components comprising:
    at least one portfolio management tool stored at a computer storage device for managing portfolio components of an enterprise;
    a middleware server executing at a computing device having at least one processing device;
    at least one client interface input device for providing interaction between a user and said at least one portfolio management tool through a portfolio model generated for said enterprise by said middleware server, wherein said middleware server comprises components executable by the at least one processing device, said components comprising:

a portfolio information gathering component for obtaining portfolio information;

resource evaluating component for identifying business resource information comprising a plurality of business resources affected by each of said portfolio components;

an analysis component for analyzing dependencies comprising at least dependencies among business resources and dependencies between business resources and the portfolio information; and a modeling component for aggregating portfolio information and the business resources information into a portfolio model.

* * * * *